United States Patent [19]

Imai

[11] Patent Number: 4,504,874
[45] Date of Patent: Mar. 12, 1985

[54] TAPE RECORDER

[75] Inventor: Yugo Imai, Tokyo, Japan

[73] Assignee: Olympus Optical Co., Ltd., Tokyo, Japan

[21] Appl. No.: 400,068

[22] Filed: Jul. 20, 1982

[30] Foreign Application Priority Data

Jul. 23, 1981 [JP] Japan .............................. 56-109447[U]
Jul. 23, 1981 [JP] Japan .............................. 56-109446[U]
Jul. 23, 1981 [JP] Japan .............................. 56-115546[U]

[51] Int. Cl.³ .............................................. G11B 5/47
[52] U.S. Cl. ...................................................... 360/66
[58] Field of Search ........................... 360/66, 61, 137; 331/46

[56] References Cited

U.S. PATENT DOCUMENTS

| 3,354,270 | 11/1967 | Smith et al. | 360/66 |
| 3,449,529 | 6/1969 | Camras | 360/66 |
| 3,652,807 | 3/1972 | Kusich | 360/66 |
| 3,689,904 | 9/1972 | Blitchingron Jr. | 360/66 |
| 3,934,267 | 1/1976 | Kosaka et al. | 360/137 |
| 4,258,402 | 3/1981 | Sato | 360/137 |

Primary Examiner—Vincent P. Canney
Attorney, Agent, or Firm—Toren, McGeady and Stanger

[57] ABSTRACT

In the disclosed tape recorder, the erasing head normally receives DC current to erase signals previously recorded by a recording/reproducing head, and the recorder housing is adapted to receive an AC erasing current from an external AC generator to supplant the DC current at the erasing head when AC erasure is required.

8 Claims, 10 Drawing Figures

TAPE RECORDER

BACKGROUND OF THE INVENTION

The present invention relates to a tape recorder using DC erasure system and more particularly to such a tape recorder capable of utilizing an AC erasure unit, if necessary.

There are two types of systems for erasing signals recorded on a magnetic tape. One is a DC erasure system employing the unidirectional residual magnetism of a magnetic substance for applying a saturating DC magnetic field to a magnetic tape. The other is an AC erasure system involving convergence of residual magnetic flux into zero value by applying a saturating AC magnetic field to the magnetic tape. The DC erasure system has the advantage of simple construction and good efficiency, and if a permanent magnet is used as a magnetic head, the power consumption during erasure is zero. Hence, the DC erasure system is usually adopted for a tape recorder in which a battery serves as a power source.

Figure 1:
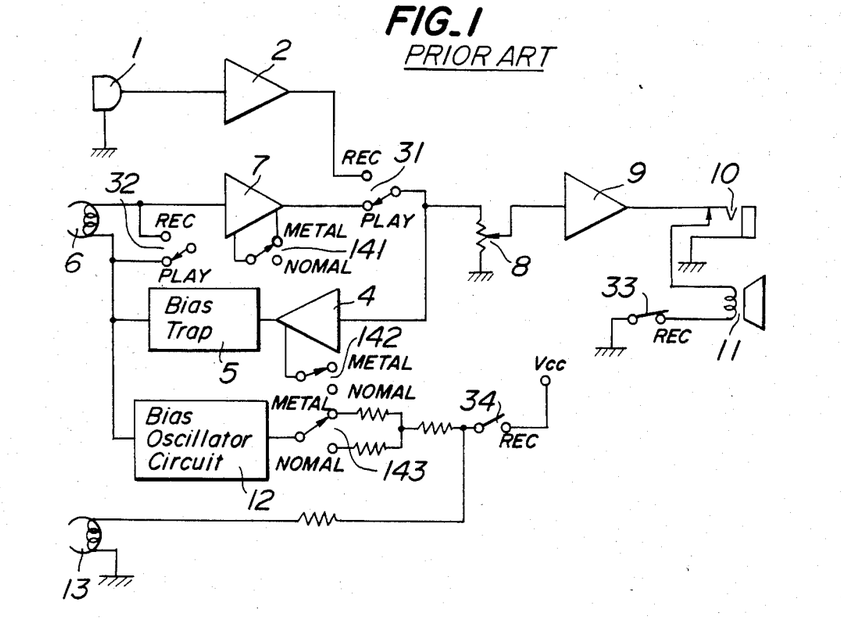
FIG. 1 is circuit diagram showing one embodiment of the conventional tape recorder.

FIG. 1 shows a tape recorder incorporating a DC erasure system. In FIG. 1 a microphone 1 is coupled to a magnetic recording and reproducing head 6 through a microphone amplifier 2, a recording and reproducing change-over switch 31, a recording amplifier 4 and a bias trap 5. The magnetic head 6 is coupled to ground through a change-over or selector switch 32 which is interlocked with the change-over or selector switch 31, and also coupled to ground through a reproducing amplifier 7, the selector switch 31, a volume control 8, a power amplifier 9, an earphone jack 10, a loudspeaker 11 and a selector switch 33 which is also ganged with the selector switch 31. The magnetic head 6 is connected to a DC power source Vcc through a bias oscillator circuit 12, and a change-over or selector switch 34 which is also interlocked with the switch 31. The DC source Vcc is connected to a magnetic erasing head 13 through the switch 34. Tape selector switches 141, 142, and 143 are switched to change contacts in accordance with the kinds of magnetic tape to be used.

In the reproducing or playing mode, the switch 31 connected the reproducing amplifier 7 to the speaker 11 through the volume control 8, the power amplifier 9 and the earphone jack 10. The switch 32 grounds the junction of the magnetic head, the bias trap 5 and the bias oscillator circuit 12. The switch 33 is closed to apply the current signals picked up from the magnetic head 6 to the speaker 11. At the same time, the switch 34 is opened to prevent DC power from being supplied to the bias oscillator circuit 12 and the magnetic erasing head 13. In this reproducing mode output signals reproduced from the magnetic head 6 are amplified by the reproducing amplifier 7 and the power amplifier 9 and supplied to the speaker 11 which generates reproduced sound. The magnitude of the reproduced sound can be adjusted by the volume control 8. If an earphone (not shown) is connected to the earphone jack 10 the sound can be heard through the earphone instead of the speaker 11.

In the recording mode the switch 31 connects the microphone 1 to the recording amplifier 4, the switch 32 connects the junction point the magnetic head 7 to ground, the switch 33 is opened to disconnect the speaker 11 from, and the switch 34 is closed so that the DC source Vcc is connected to the bias oscillator circuit 12 and the magnetic erasing head 13. In this recording mode when sounds are applied to the microphone 1 its output is amplified by the microphone amplifier 2 and the recording amplifier 4 and supplied to the magnetic head 6 as a recording signal current through the bias trap 5. At the same time, the recording head 6 receives bias current from the bias oscillator circuit 12. The output of the microphone 1, therefore, is recorded onto a magnetic tape (not shown) by the head 6. In this case the erasing head 13 receives the DC erasing current from the DC source Vcc so that the signals which have been recorded on the magnetic tape are erased before recording new signals. Such a tape recorder perform temporary recording and reproduction operations.

However, this tape recorder generates a large number erasing noises which arise from the DC erasing system. The uneven magnetic layer of the tape and the uneven contact condition of the magnetic head to the magnetic tape cause uneven residual magnetic flux density. This results in an appearance of noise which severely degrades the quality of the reproduced sound. Moreover, the recorded or reproduced signal contain large distortions as compared with signals processed by an erasing system. Because of these disadvantages, a DC erasure system limit the application of a recorder to a narrow scope.

A portable tape recorder utilizes a battery as a power supply source. However, indoors, where power lines are available, one can use a transducer composed of a transformer and rectifier for converting the commercial supply voltage into a DC voltage as the power source of the tape recorder.

SUMMARY OF THE INVENTION

It is an object of the present invention to overcome the above described disadvantages of conventional tape recorders.

It is another object of the present invention to provide a tape recorder in which the DC erasure system is used in ordinary circumstances and the AC erasure system is used by connecting an AC erasure unit to the tape recorder, if necessary, thereby enabling recording and reproduction of high quality so as to permit application of the tape recorder to the various purposes intended therefore.

According to the present invention there is provided a tape recorder adopting a DC erasure system comprising a tape recorder body having a first magnetic head for recording and reproducing the sound signals onto and from a magnetic tape by a signal processing circuit, a second magnetic head connected to receive DC erasing current from a DC supply source for erasing previously recorded signals during recording mode, a speaker for generating the sound from signals reproduced by the first magnetic head, and an AC erasure unit capable of connecting to the body for generating AC erasing current to be supplied to the erasing head instead of the DC supply source. The AC erasure unit comprises an auxiliary DC source, a switching circuit connected to the auxiliary DC source and operated by the DC supply source of the body during recording mode and an oscillator circuit connected to the switching circuit to receive the current from the auxiliary DC source in response to operation of the switching circuit for generating oscillating currents to be supplied to the erasing head. The AC erasure unit further comprises a level detecting circuit connected between the switching circuit and the oscillator circuit for changing the magnitude of the AC current generated from the oscillator circuit in accordance with the level of DC erasing current to be supplied to the erasing head during recording mode. The tape recorder body comprises a bias oscillator circuit connected between the recording head and the DC supply source and having an oscillating coil for generating bias current during recording mode, and the AC erasure unit comprises a detecting coil for generating output signals by mutual induction with the oscillating coil. The AC erasure unit further comprises an amplifier circuit connected between the detecting coil and the auxiliary DC source for amplifying the AC output of the detecting coil. The AC erasure unit further comprises a switching circuit operated in response to the output of the detecting coil, and an oscillating circuit connected to the switching circuit to receive the current from the auxiliary DC source in response to operation of the switching circuit for generating oscillating currents to be supplied to the erasing head. The AC erasure unit further comprises means for controlling the magnitude of AC current from the oscillating circuit in accordance with the magnitude of output signal of the detecting coil. The AC erasure unit is connected to the erasing head by a plug and jack connection.

BRIEF DESCRIPTION OF THE DRAWINGS

These and other features and advantages of the present invention will become readily apparent from the following detailed description of one embodiment of the present invention, particularly when taken in connection with the accompanying drawings wherein like reference numerals designate like or functionally equivalent parts, and wherein.

DESCRIPTION OF THE PREFERRED EMBODIMENT

Figure 2:
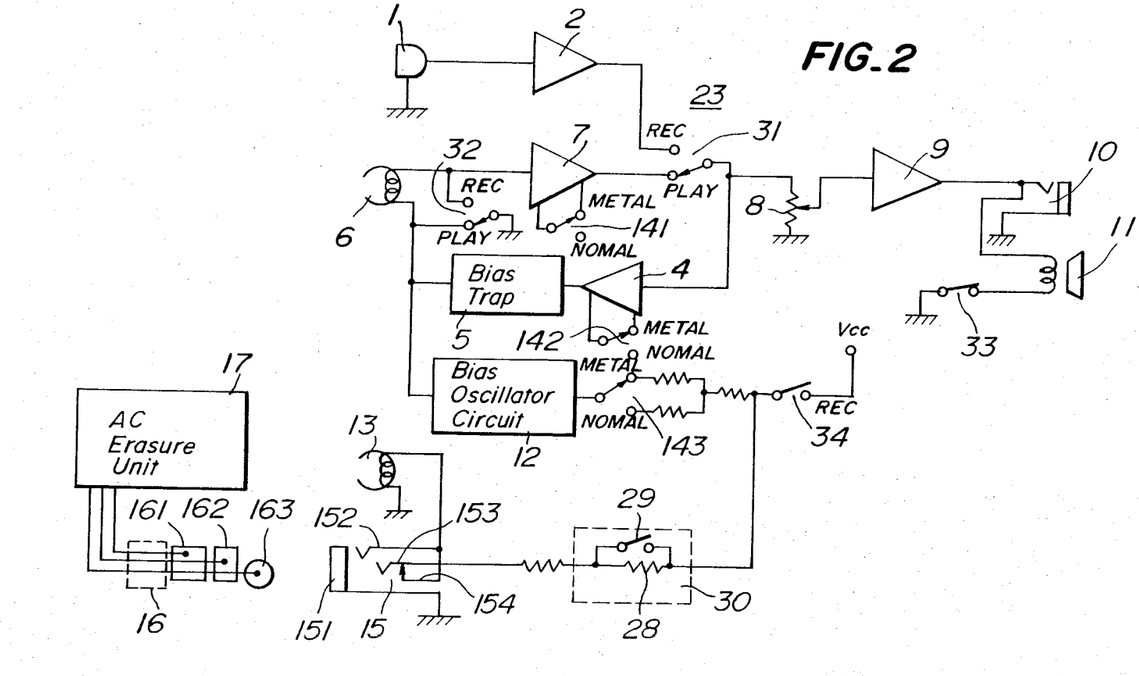
FIG. 2 is a circuit diagram showing first embodiment of a tape recorder to the present invention.

Referring now to the drawings, a first embodiment of a tape recorder according to the present invention is shown in FIG. 2. In this embodiment a jack member 15 is provided between the change-over switch 34 and the erasing head 13. The jack member 15 comprises jack contact segments 151, 152, 153 and 154 and the contact segments 153 and 154 are normally closed with each other and opened from each other when a plug member 16 is inserted in the jack member 15.

Figure 3:
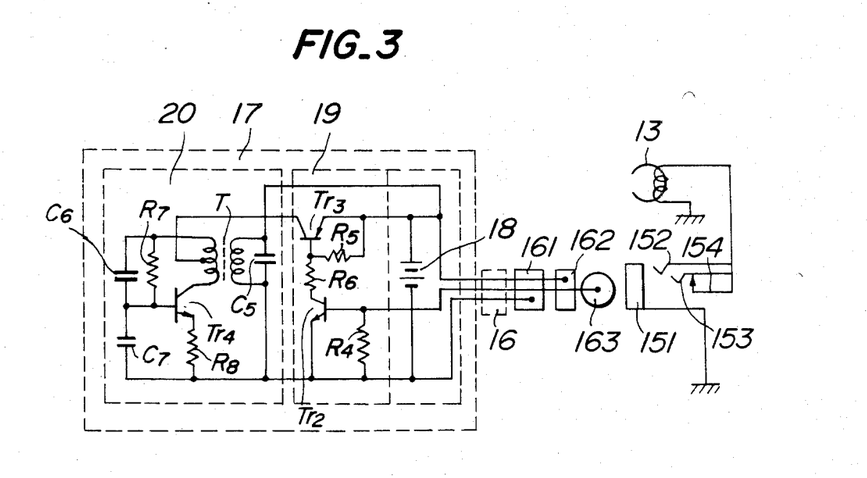
FIG. 3 is a circuit diagram illustrating an AC erasure unit shown in FIG. 2.

The plug member 16 is connected to an AC erasure unit 17 and comprises plug contact segments 161, 162 and 163 which are correspondent to the jack contact segments 151, 152 and 153 of the jack member 15, respectively. The AC erasure unit 17 comprises an auxiliary DC source 18, a switching circuit 19 and an oscillator circuit 20 as shown in FIG. 3. The auiliary source 18 is constructed of a battery or means for rectifying and smoothing the voltage of a commercial supply source. The switching circuit 19 comprises transistors Tr$_2$ and Tr$_3$ and resistors R$_3$, R$_4$ and R$_5$ which are connected as shown in FIG. 3. When the plug member 16 is inserted in the jack member 15, closure of the switch 34 in the tape recorder body causes the DC source to turn on the transistors Tr$_2$ and Tr$_3$. The oscillator circuit 20 comprises a transformer T, a transistor Tr$_4$, capacitors C$_6$, C$_7$, C$_8$ and resistors R$_7$ and R$_8$ which are connected as shown in FIG. 3. When the transistors in the switching circuit 19 turn on the oscillator circuit 20 operates with the current from the auxiliary DC source 18 and generates oscillating (AC) currents.

The circuits of FIGS. 2 and 3 operate as follows:

When the AC erasure unit 17 is not used the contact segments 153 and 154 of jack member 15 are closed. The tape recorder body is then set to the recording mode and the switch 34 is closed so that DC current is supplied to the erasing head 13 through the jack member 15 from the DC source Vcc resulting in a performance of DC erasure. In this case the recording operation is the same manner as that described in FIG. 1 so that its explanation is omitted.

When the AC erasure unit 17 is used the plug member 16 is inserted in the jack member 15 so that the contact segments 153 and 154 of the jack member 15 are separated from each other and the respective contact segments 161 and 151, 162 and 152 and 163 and 153 contact each other. Under such a condition the tape recorder body is set in the recording mode and the change-over switch 34 is closed so that the current of the DC source Vcc is supplied to the transistor Tr$_2$ of the switching circuit 19 through the contact segments 153 and 163 thereby turning on the transistor Tr$_2$ and then the transistor Tr$_3$. The auxiliary DC source 18, therefore, supplies the current to the oscillator circuit 20 resulting in oscillation of the circuit 20 so that the oscillating currents of the circuit 20 are supplied to the erasing head 13 through the contact segments 162 and 152 resulting in a performance of AC erasure.

Figure 4:
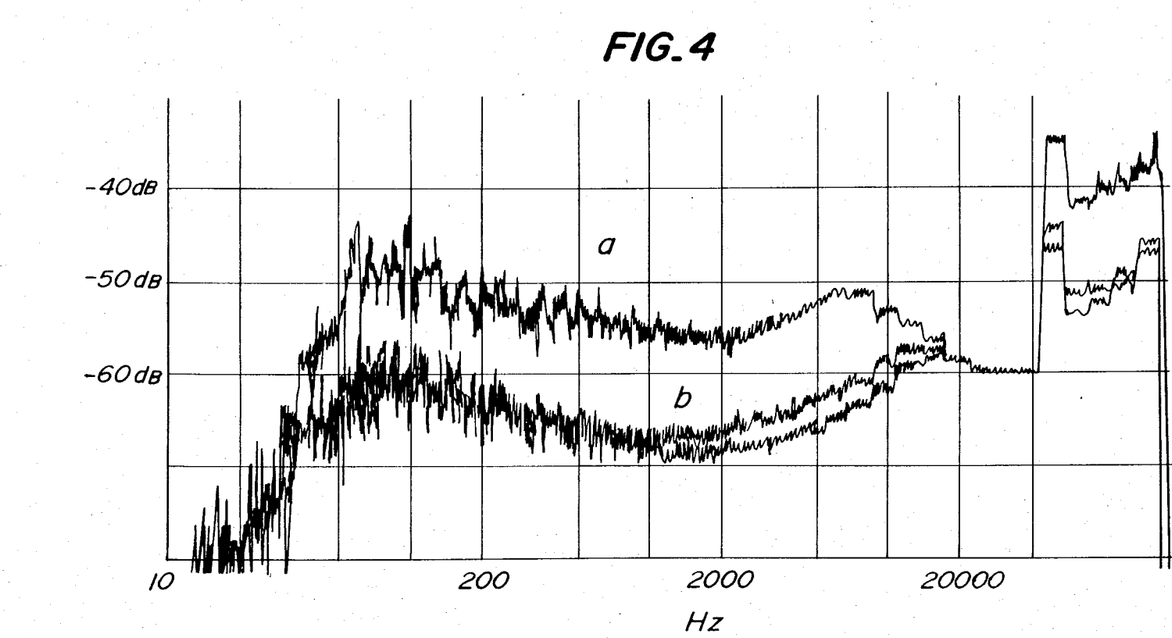
FIG. 4 is a characteristic diagram explaining operation of the first embodiment shown in FIG. 2.

According to the present invention the S/N ratio obtained by the AC erasure system can be improved as shown in FIG. 4a, that is, by about 10 dB as compared with the DC erasure system shown in FIG. 4b. This corresponds to the effect equal to or no more than that obtained by using an expensive noise reduction system. In this case the recording operation is also the same manner as that described in FIG. 1 so that its explanation is omitted.

Figure 5:
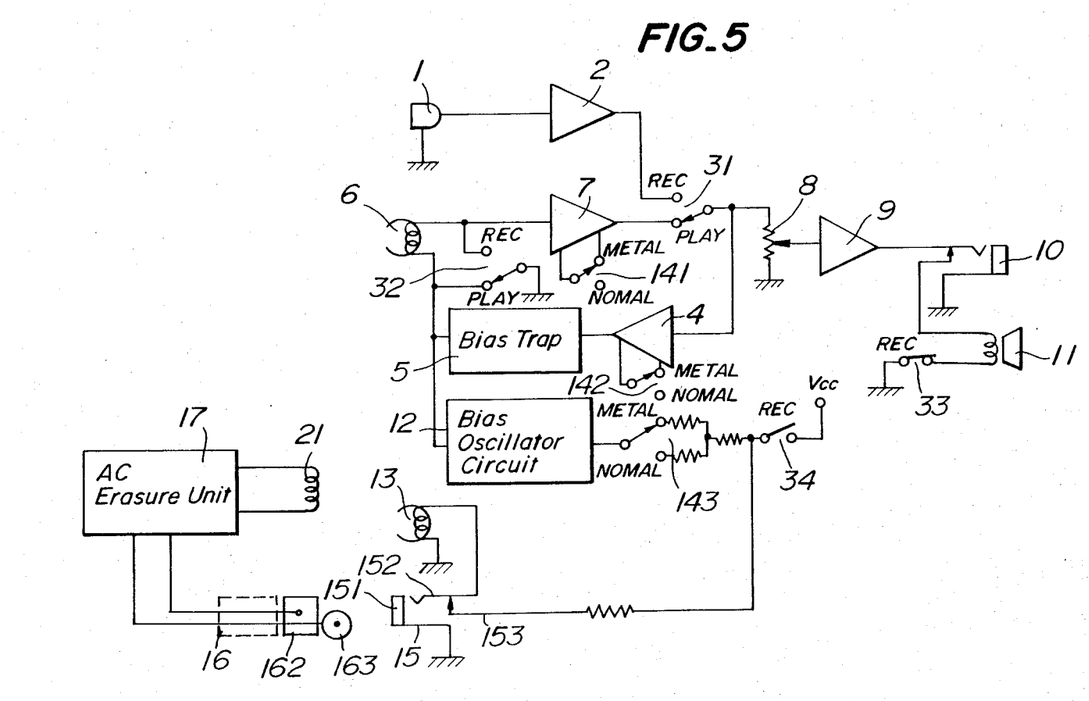
FIG. 5 is a circuit diagram showing second embodiment of the tape recorder according to the present invention.

FIG. 5 shows another embodiment of the tape recorder according to the present invention. In this embodiment the jack member 15 is provided between the switch 34 and the erasing head 13. The jack member 15 comprises jack contact segments 151, 152 and 153 and the contact segments 152 and 153 are mormally closed with each other and opened from each other when the plug member 16 is inserted in the jack member 15.

Figure 6:
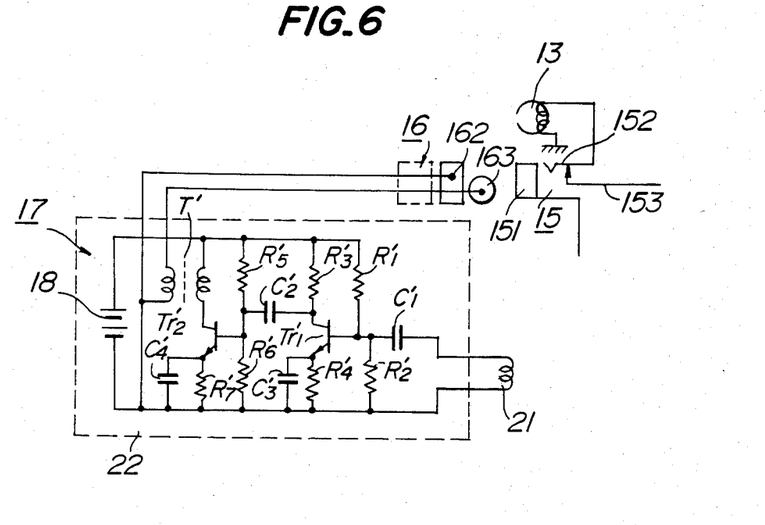
FIG. 6 is a circuit diagram illustrating the AC erasure unit shown in FIG. 5.

The plug member 16 is connected to the AC erasure unit 17 and comprises plug contact segments 162 and 163 which correspond to the jack contact segments 151 and 152 of the jack member 15, respectively. The AC erasure unit 17 comprises the auxiliary DC source 18, a detecting coil 21 and an amplifier circuit 22 as shown in FIG. 6. The detecting coil 21 is placed near an oscillating coil 121 (shown in FIG. 7) in the bias oscillator circuit 12. The mutual induction of coil 21 and oscillator coil 121 generates an oscillating (AC) output in accordance with the bias current of the bias oscillator circuit 12 by mutual induction with the oscillating coil 121. The amplifier circuit 22 comprises transistors $Tr_1'$ and $Tr_2'$, a transformer T', capacitors $C_1'$, $C_2'$, $C_3'$ and $C_4'$, resistors $R_1'$ and $R_7'$ and the auxiliary DC source 18 which are connected as shown in FIG. 6. When the plug member 16 is inserted in the jack member 15 the output of the detecting coil 21 is amplified by the amplifier circuit 22 which generates AC current to the erasing head 13. The DC source 18 is constructed by the battery or means for rectifying smoothing the voltage of the commercial supply source.

Figure 7:
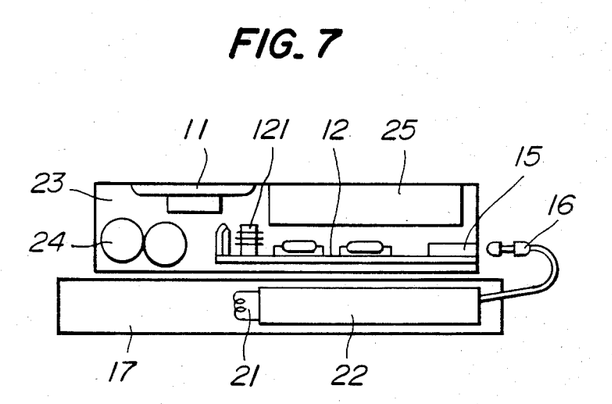
FIG. 7 is a side view showing a schematic construction of combination of the AC erasure unit and the tape recorder body shown in FIG. 5.

As shown in FIG. 7 the plug member 16 is inserted in the jack member 15 of a tape recorder body 23 which is placed on the AC erasure unit 17. Under such a condition the detecting coil 21 is positioned near the oscillating coil 121 of the bias oscillator circuit 12. Reference numeral 11 is a loudspeaker, 24 is a battery and 25 is a cassette chamber.

The circuits of FIGS. 5 and 6 operate as follows:

When the AC erasure unit 17 is not used the contact segments 152 and 153 of the jack member 15 are closed. Under such a condition the tape recorder body is set in the recording mode and the change-over switch 34 is closed so that the DC source Vcc supplies DC current to the erasing head 13 through the jack member 15 resulting in a performance of DC erasure. In this case the recording operation is the same as that described in FIG. 1 so its explanation is omitted.

When the AC erasure unit 17 is used the plug member 16 is inserted in the jack member 15 so that the contact segments 152 and 153 of the jack member 15 are separated from each other and the respective contact segments 162 and 151 as well as 163 and 152 are closed to contact each other. Under such a condition the tape recorder body 23 is set in the recording mode and the switch 34 is closed so that the bias oscillator circuit 12 operates and the bias current is supplied to the recording head with signal currents to be recorded resulting in a performance of recording on the magnetic tape. In this case the AC current flows in the oscillating coil 12 by oscillating operation of the bias oscillator circuit 12 so that an AC output current is generated in the detecting coil 21 of the AC erasure unit 17 placed near the oscillating coil 121 by mutual induction. This AC output is amplified by the amplifier circuit 22 and supplied to the erasing head 13 as the AC erasing current through the contact segments 163 and 152. When the tape recorder is set in the recording mode and the bias oscillator circuit 12 operate. Therefore, the signals previously recorded on the magnetic tape are completely erased by AC erasing current having the same frequency as the bias frequency of the AC erasure unit 17. In this case the magnitude of AC erasing current can easily be increased or decreased in accordance with the magnitude of bias current.

Figure 8:
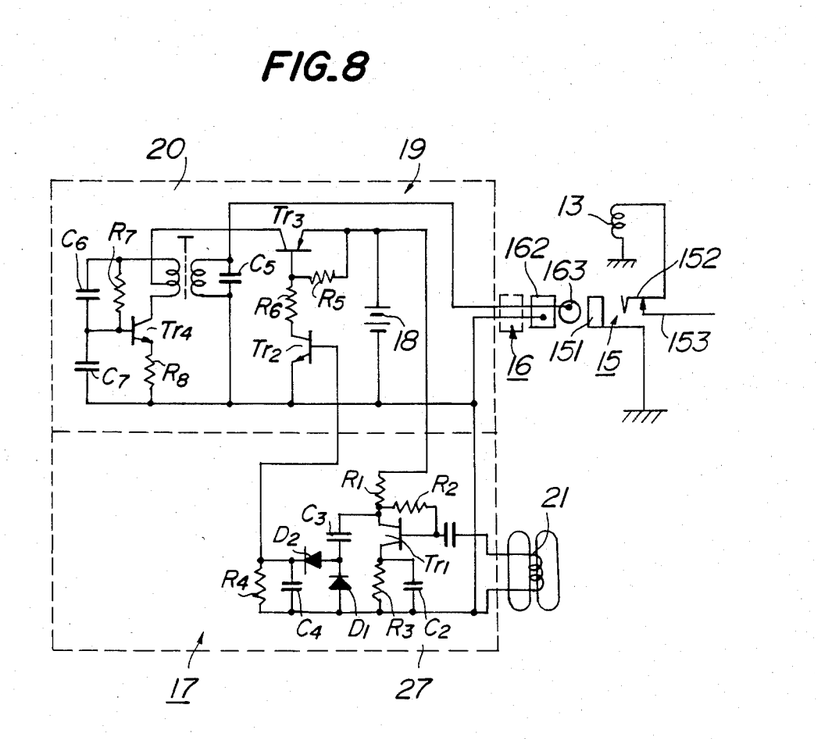
FIG. 8 is a circuit diagram illastrating a modification of the AC erasure unit shown in FIG. 5.

FIG. 8 shows a modification of the AC erasure unit 17 shown in FIG. 5. In this embodiment the AC erasure unit 17 comprises a detecting coil 21, a detecting circuit 27, the switching circuit 19 and the oscillator circuit 20 as shown in FIG. 8. The detecting coil 21 is placed near the oscillating coil 121 (shown in FIG. 9) provided in the bias oscillator circuit 12 thereby generating oscillating (AC) output in accordance with the bias current of the oscillator circuit 12 by mutual induction with the oscillating coil 121. The detecting circuit 27 comprises transistor $Tr_1$ capacitors $C_1$ to $C_4$, diodes $D_1$ and $D_2$ and resistors $R_1$ to $R_4$ which are connected as shown in FIG. 8. The output of the detecting coil 21 is amplified and detected by the detecting circuit 27 thereby generating an detected output. The switching circuit 19 comprises transistors $Tr_2$ and $Tr_3$, resistors $R_5$ and $R_6$ the auxiliary DC source 18 thereby rendering the transistors $Tr_2$ and $Tr_3$ ON-state by the output of the detecting circuit 27. The oscillator circuit 20 comprises the transformer T, transistor $Tr_4$, capacitors $C_5$ to $C_7$ and resistors $R_7$ and $R_8$ which are connected as shown in FIG. 8, thereby operating by the auxiliary DC source 18 in response to ON-condition of the switching circuit 19 to generate oscillating currents. The DC source 18 is constructed of the battery or means for rectifying and smoothing the voltage of the commercial supply source.

Figure 9:
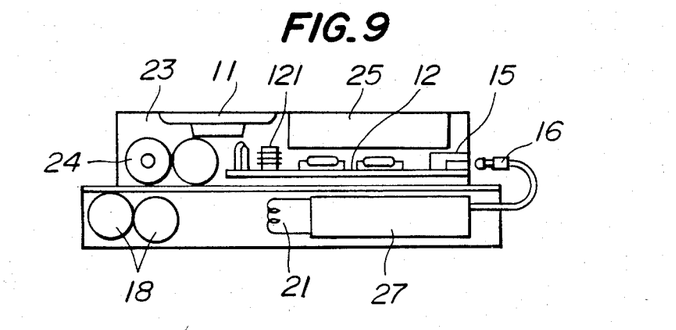
FIG. 9 is a side view showing a schamatic construction of combination of the AC erasure unit and the tape recorder body shown in FIG. 8.

As shown in FIG. 9 the plug member 16 is inserted in the jack member 15 of the body 23 which is placed on the AC erasure unit 17. Under such a condition the detecting coil 21 is positioned near the oscillating coil 121 of the bias oscillator circuit 12.

The circuit of FIG. 8 functions as follows:

When the AC erasure unit 17 is not used the contact segments 152 and 153 of the jack member 15 are closed. Under such a condition the tape recorder is set in the recording mode and the switch 34 is closed so that the DC source Vcc supplies DC current to the erasing head 13 through the jack member 15 resulting in a performance of DC erasure. In this case the recording operation is the same as that described in FIG. 1 so that its explanation is omitted.

When the AC erasure unit 17 is used the plug member 16 is inserted in the jack member 15 so that the contact segments 152 and 153 of the jack member 15 are separated from each other and the contact segments 162 and 151 as well as 163 and 152 are closed to contact with each other, respectively. Under such a condition the tape recorder body 23 is set in the recording mode and the change-over switch 34 is closed so that the bias oscillator circuit 12 operates and the bias current is supplied to the recording head 6 with signal currents to be recorded resulting in a performance of recording on the magnetic tape. In this case the AC current flows in the oscillating coil 12 by oscillating operation of the bias oscillator circuit 12 so that AC output current is generated in the detecting coil 21 of the AC erasure unit 17 placed near the oscillating coil 121 by mutual induction. This output current is supplied to the detecting circuit 27 in which the output is amplified by the transistor $Tr_1$ and detected by the diodes $D_1$ and $D_2$ thereby supplying its output to the transistor $Tr_2$ of the switching circuit 19 as a detected output. When the transistors $Tr_2$ and $Tr_3$ turn on in order the DC source 18 supplies DC current to the oscillator circuit 20 so that the output AC currents of the oscillator circuit 20 are supplies to the erasing head 13 through the contact segments 163 and 152 as AC erasure current thereby erasing signals previously recorded on the magnetic tape.

The improvement in S/N ratio obtained by the second and the third embodiments is the same as that obtained in the first embodiment shown in FIG. 4.

According to the construction shown in the above described embodiment the tape erasing can be performed by the DC erasure system having low consumption power at the portable use and by the AC erasure system with the coupling of the AC erasure unit in case of using the tape recorder in the inside of a house in order to effect the recording and reproduction with high quality so that the recording and reproduction can be performed with good S/N ratio. Moreover, the oscillating frequency, that is, bias frequency of the bias oscillator circuit and the erasing frequency for AC erasure can be made equal with each other so that problems such as beat interference caused by two different frequencies can be prevented. Thus, it is preferable to apply the present invention to a tape recorder with a radio which requires variation of bias frequency.

Figure 10:
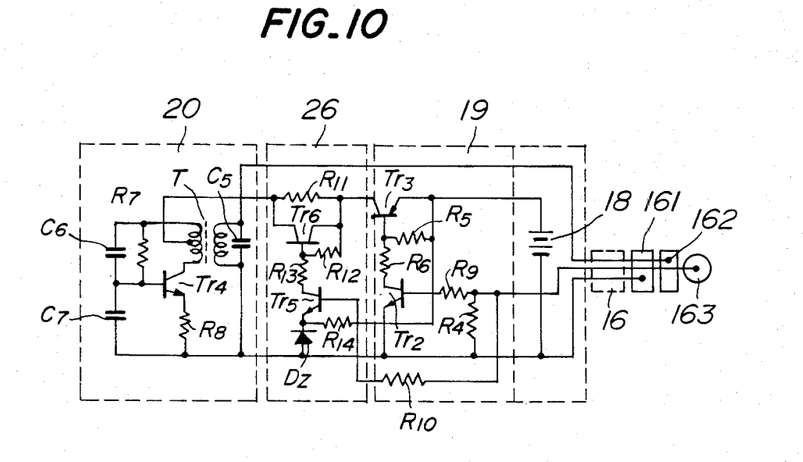
FIG. 10 is a circuit diagram illustrating a modification of the AC erasure unit shown in FIG. 3.

It is further understood by those skilled in the art that the forgoing description is a preferred embodiment of the disclosed device and the present invention is not limited thereto and that various changes and modifications may be made in the present invention without departing from the spirit and scop thereof. For example, as shown in FIG. 10 the AC erasure unit 17 of FIG. 3 may comprise a level detecting circuit 26 having a zener diode $D_z$, transistors $Tr_5$ and $Tr_6$ and resistors $R_{11}$, $R_{12}$ and $R_{13}$ which are connected as shown in FIG. 10. The tape recorder body 23 of FIG. 2 may comprise a circuit 30 of a resistor 28 and a tape change-over switch 29 inserted between the switch 34 and the jack member 15. This switch 29 is used for a tape having low coercive force by opening the switch 29 and for a tape having high coercive force by closing it, so that power consumption can be prevented at the use of the tape having low coercive force. In case of connecting the AC erasure unit 17 shown in FIG. 10 to the tape recorder the voltage applied to the level detecting circuit 26 becomes high or low in accordance with switching on and off of the switch 29 so that this voltage is compared with the reference voltage, that is, the zener voltage of the zener diode $D_z$ and the current supplied to the oscillating circuit 20 is varied by the compared result and thus the AC erasing current supplied to the erasing head 13 can be changed in accordance with the kinds of magnetic tape. That is, provided that the zener voltage of the zener diode $D_z$ as a reference source is $V_z$ and the base-emitter voltage of the transistor $Tr_5$ is $V_{BE}$, if the voltage applied to the level detecting circuit 26 is higher than the sum $(V_z + V_{BE})$ the transistors $Tr_5$ and $Tr_6$ turn on, and the resistor $R_{11}$ is short-circuited resulting in increase of current supplied to the oscillator sircuit 20 so that the AC erasing current supplied to the erasing head 13 becomes increased and thus the tape having high coercive force can be erased. As the reference voltage the transistor, the diode and the voltage divider can be used instead of the zener diode. Any connection means other than the jack and plug connection is utilized as a connection of the AC erasure unit. Moreover, it is possible to supply the erasing current to the erasing head 13 in accordance with the kinds of magnetic tape by controlling the oscillator circuit 20 by the change of output induced on the detecting coil 21 which is varied by the change of bias current.

What is claimed is:

1. A tape recorder system comprising a tape recorder housing having a signal processing circuit, a first magnetic head responsive to said signal processing circuit for recording and reproducing the sound signals onto and from a magnetic tape, a DC supply connection coupleable to a battery, a second magnetic head connected to receive DC erasing current from the DC supply connection for erasing previously recorded signals during a recording mode, and a speaker for generating the sound from signals reproduced by the first magnetic head; and an AC erasing unit capable of connecting to the housing for generating AC erasing current to be supplied to the erasing head instead of the DC supply source said erasing unit being outside of and separate from the tape recorder housing, and being mechanically and conductively coupleable to and decoupleable from said head, said tape recorder including a bias oscillator circuit connected between said recording head and the DC supply source and having an oscillator coil for generating bias current during the recording mode, said AC erasing unit including a detecting coil inductively coupled with said oscillatory coil when the erasing unit is mechanically and conductively coupled to said tape recorder for controlling the output signals of said erasing unit.

2. A tape recorder as claimed in claim 1, wherein the AC erasuring unit comprises an auxiliary DC source, a switching circuit connected to the auxiliary DC source and operated by the DC supply source of the housing during recording mode and an oscillator circuit connected to the switching circuit to receive the current from the auxiliary DC source in response to operation of the switching circuit for generating oscillating currents to be supplied to the erasing head.

3. A tape recorder as claimed in claim 2, wherein the AC erasing unit further comprises a level detecting circuit connected between the switching circuit and the oscillator circuit for changing the field of the AC current generated from the oscillator circuit in accordance with the level of DC erasing current to be supplied to the erasing head during recording mode.

4. A tape recorder as claimed in claim 1, wherein the AC erasing unit further comprises an amplifier circuit connected between the detecting coil and the auxiliary DC source for amplifying the AC output of the detecting coil.

5. A tape recorder as claimed in claim 1, wherein the AC erasing unit further comprises a switching circuit operated in response to the output of the detecting coil, and an oscillating circuit connected to the switching circuit to receive the current from the auxiliary DC source in response to operation of the switching circuit for generating oscillating currents to be supplied to the erasing head.

6. A tape recorder as claimed in claim 5, wherein the AC erasing unit further comprises means for controlling the magnitude of AC current from the oscillating circuit in accordance with the magnitude of output signal of the detecting coil.

7. A tape recorder as claimed in claim 1, wherein the AC erasing unit is connected to the erasing head by a plug and jack connection.

8. For a tape recorder including a housing having a signal processing circuit, a magnetic head responsive to said signal processing circuit for recording and reproducing sound signals onto and from a magnetic tape, a DC supply connection coupleable to a battery, a second magnetic head connected to receive DC erasing current from the DC supply connection for erasing previously recorded signals during a recording mode, a bias oscillator circuit connected between said recording head and the DC supply source and having an oscillator coil for generating bias current during the recording mode, means for receiving AC signals to be supplied to said second magnetic head in lieu of DC erasing current from the DC supply connection, and a speaker for generating the sound from signals reproduced by the first magnetic head;

an AC erasing unit, comprising:

means for conductively coupling and decoupling said erasing unit to said tape recorder while said erasing unit remains otherwise outside of said tape recorder housing;

a detecting coil inductively coupled with said oscillating coil when the erasing unit is conductively coupled to said tape recorder for controlling the output signals of said erasing unit.

* * * * *